Feb. 6, 1923.
J. C. SMITH.
GAUGE.
FILED SEPT. 1, 1920.
1,444,565.
3 SHEETS—SHEET 2.
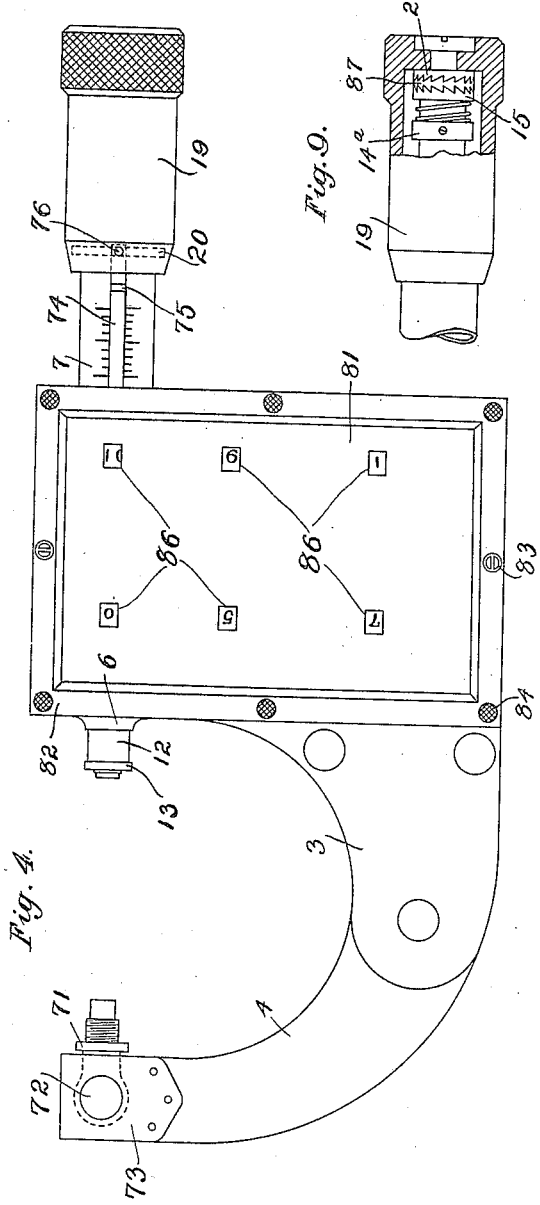
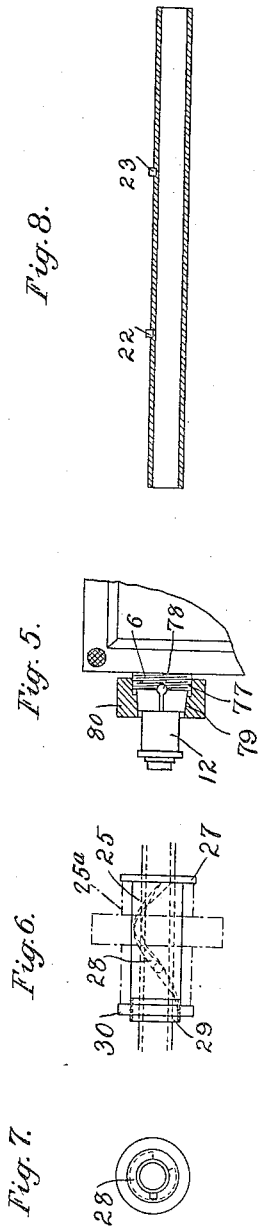
INVENTOR.
John Cicero Smith
BY Wm Wallace White
ATT'Y.

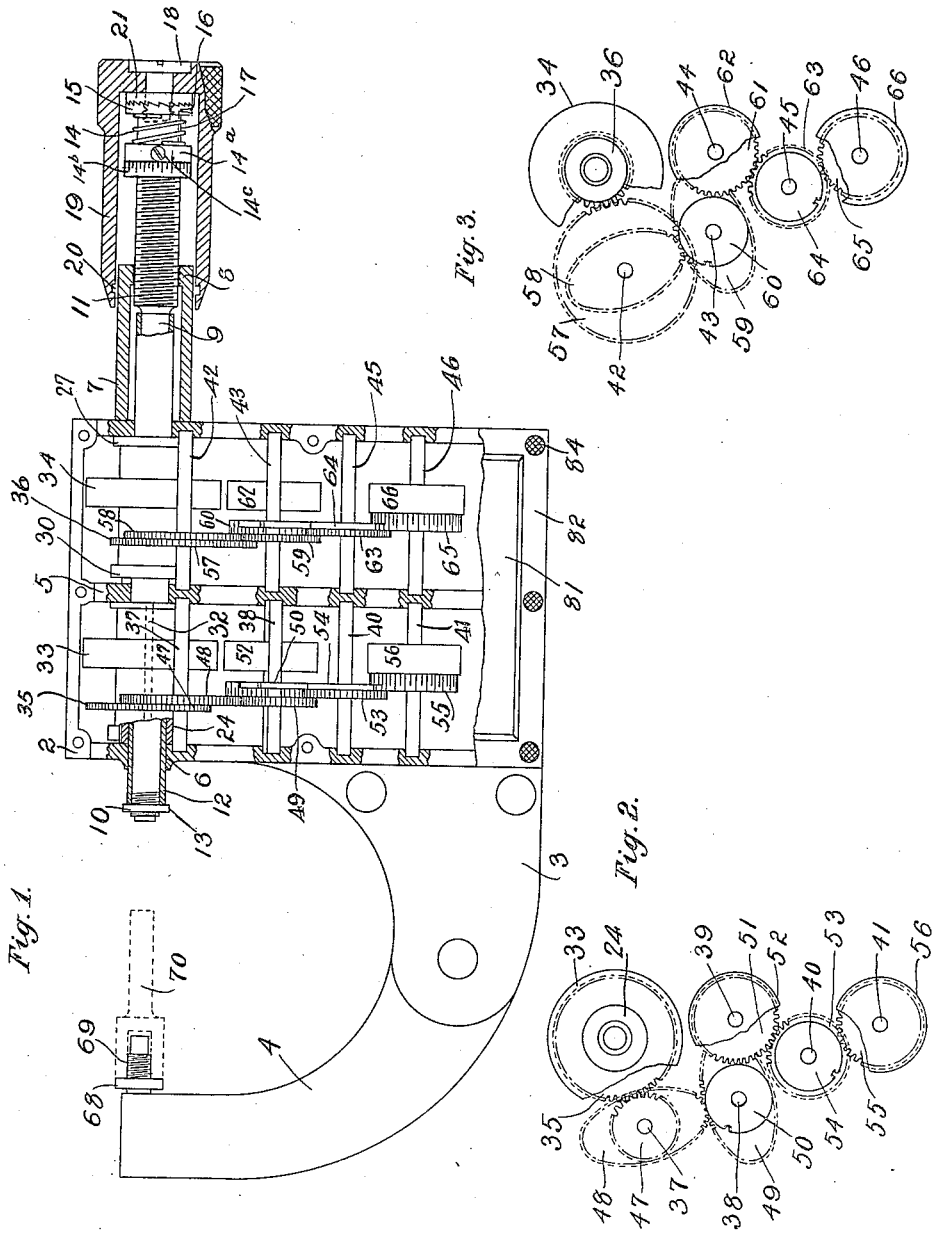

Feb. 6, 1923.

J. C. SMITH.
GAUGE.
FILED SEPT. 1, 1920.

INVENTOR:
John Ciceri Smith
By Wm Wallace White
ATTY.

Patented Feb. 6, 1923.

1,444,565

UNITED STATES PATENT OFFICE.

JOHN CICERI SMITH, OF LONDON, ENGLAND.

GAUGE.

Application filed September 1, 1920. Serial No. 407,313.

*To all whom it may concern:*

Be it known that I, JOHN CICERI SMITH, London, W. 4, England, a subject of the King of Great Britain and Ireland, have invented certain new and useful Improvements in or Relating to Gauges, of which the following is a specification.

This invention relates to gauges generally but more particularly to the type of micrometer in which the reading is indicated on a dial or dials. The object of this invention is to provide an improved gauge.

A gauge made in accordance with this invention is provided with one or more sets of elliptical gears for the purpose of accelerating or retarding the peripheral speed of the dials at the moment when the gearing is on the point of changing the reading of the dials (this picks up accumulated backlash of the train of gears) and causing the dials to move step by step with a quick and defined movement, an extra collet or tube on one or more of the spindles to permit angular adjustment, one form of which may consist of a double tube with an inter-tube clamping device, one or more sets of gears with compensating means for adjusting the small final differences between the scales, as for example, in the case of instruments showing both metric and English scales or vulgar fractions and decimal equivalents and a ratchet head with means for adjustable friction resistance so that when a predetermined turning effort in either direction is applied, the head rotates without altering the reading of the gauge, the arrangement being such that the risk of the friction resistance or tension of the spring being altered by accidental or unobserved movement is avoided.

In order to read metric dimensions and inches, I may select a thread which gives neither measurement directly and compensates for each system of measurement by gaining or losing motion, for this purpose I may have two dials on a sleeve or sleeves, one to read metric and the other to read inches and fractions and connected to the spindle by a pin or key engaging with inclined slots in the sleeves, one giving greater motion to the dial and the other lesser motion than the rotation of the micrometer screw, and for this purpose I may employ back-gearing to gain or lose motion.

I may provide a relatively thick and strong glass cover to the gear box preferably either rectangular or circular with a corresponding frame and guide notches for alignment, additional and interchangeable anvils of different lengths adapted to be secured to the fixed anvil so as to take various ranges of sizes in the gap, a variety of sizes of shoes interchangeable with the head, the head and anvil connected to the shoe so as to allow of horizontal, vertical, or radial adjustment to bring the spindle of the gauge in alignment with the anvil, an anvil formed on a sphere, suitably mounted so as to have universal movement, means for fixing the gauge when in use for repetition work and in order to protect the mechanism from being tampered with the gear box covering may be formed and attached to the casing in such a manner that it cannot be removed without being noticed.

Referring to the drawings filed herewith:—

Fig. 1 is a part sectional elevation of one form of gauge made in accordance with this invention;

Fig. 2 is a diagrammatic elevation of one of the trains of gears in Fig. 1;

Fig. 3 is a diagrammatic elevation of the other train of gears in Fig. 1;

Fig. 4 shows a side elevation of the micrometer with further modifications embodied therein;

Fig. 5 is a device for locking the head of the gauge;

Fig. 6 is a diagrammatic view of one of the compensating devices used in Figs. 1 and 4;

Fig. 7 is an end view of Fig. 6;

Fig. 8 is a section of the sleeve as shown in Figs. 1 and 4;

Fig. 9 shows another form of ratchet head.

Figure 10:
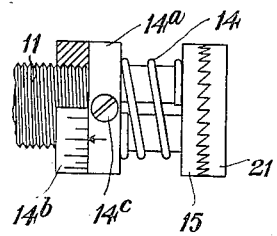
Fig. 10 is a side, partly sectional view showing in greater detail the graduated adjustable collar for adjusting the ratchet head.

The micrometer shown comprises a body or gear box 2 provided with wings 3 to receive the shoe 4. The body 2 is formed in the shape of a box and is provided with a partition 5 an extension 6 and a second extension 7 threaded internally at 8 to take the threaded portion 11 of the spindle 9 of the micrometer.

The spindle 9 carries at one end a ratchet collar 15 slidable on the spindle, said collar being guidded in its sliding movement and held against rotation independently of the spindle by means of an inwardly extending key 16 carried thereby, which engages a keyway 17 in the spindle. A coiled spring 14 encircles the spindle and exerts its tension on the collar 15, the tension of said spring being adjustable by means of a collar 14ª which is slidable on the spindle and is retained against rotation independently of the spindle by means of a set screw 14ᶜ. If desired, the set screw may be engaged within the keyway 17 so as to act as a key for the collar 14ª. A peripherally graduated collar 14ᵇ is threaded on the portion 11 of the spindle and abuts against the collar 14ª, the latter being provided with an index mark for cooperation with the graduations of the collar 14ᵇ. This end of the spindle is enclosed by a thimble 19, the inner end of which overlaps the tubular extension 7 of the body or casing 2 and is provided with an interior annular groove 20. The thimble carries secured to the inner side of its end wall a fixed ratchet 21, adapted to cooperate with the ratchet 15 on the spindle, the ratchet 21 and thimble being drilled to permit the passage of a stud 18, which is threaded into the end of the spindle, the thimble being countersunk to receive the head of said stud and being freely rotatable thereon.

Upon the spindle 9 is mounted a sleeve 12, which extends entirely through the casing 2, one end of said sleeve abutting the shoulder formed by the threaded portion 11 of the spindle and the opposite end terminating just short of the spindle, the latter being threaded as at 10 to receive a lock nut 13 for securing the sleeve in any desired position. The sleeve 12 is provided exteriorly thereof with a pair of radially extending lugs 22 and 23 (see Fig. 8) forming keys. A pair of sleeves 24 and 25 is mounted on the sleeve 12 within the casing 2, one at each side of the partition 5, the sleeve 24 being provided with a longitudinally extending slot 32 (shown in dotted lines in Fig. 1), for engagement with the key 22, while the sleeve 25 is provided with a helical slot 28 (shown in dotted lines in Fig. 6) for engagement with the key 23. By this construction, the sleeve 24 is prevented from rotating relative to the sleeve 12, but the latter is movable longitudinally with relation to sleeve 24, while the helical keyway 28 permits an angular adjustment of the sleeve 25 relative to the sleeve 12 when the latter is rotated and thus moved longitudinally of the sleeve 25. Secured on the sleeve 24 are an indicator dial 33 and a toothed pinion 35, while on the sleeve 25 are secured a similar indicator dial 34 and a pinion 36. These dials and pinions, however, instead of being secured directly on the sleeves 24 and 25, might be formed on or secured to separate sleeves which are in turn secured on the sleeves 24 and 25. Such a construction is illustrated in Fig. 6, wherein the sleeve 25 is shown provided at one end with a collar 27 and at the other end 29 is threaded for the reception of a nut 30 for securing an exterior sleeve 25ª, on which is carried the dial 34, said dial and sleeve 25ª being shown in dotted lines.

Mounted in suitable bearings within the casing 2, at one side of the partition 5, is a plurality of shafts 37, 38, 39, 40 and 41, respectively, and at the opposite side of the partition a plurality of shafts 42, 43, 44, 45 and 46, respectively, the relative locations of the shafts of the two groups being best shown in end view respectively in Figs. 2 and 3. Beginning with the left hand group of shafts as shown in Figs. 1 and 2, the shaft 37 carries a pinion 47 in mesh with the pinion 35 on the sleeve 24. Said shaft 37 also carries an eccentric or elliptical pinion 48, in mesh with a similar pinion 49 carried by the shaft 38, which shaft also carries an escapement disk 50. The shaft 39 carries an escapement pinion 51, adapted to cooperate with the disk 50 in a manner hereinafter to be described. Shaft 39 also carries an indicator dial 52. The shaft 40 carries a pinion 53 in mesh with pinion 51, said shaft also carrying an escapement disk 54 adapted to cooperate with an escapement pinion 55 carried by the shaft 41, said shaft also carrying an indicator dial 56.

In like manner, the group of shafts shown at the right of Fig. 1, and in Fig. 3 is provided with similar gearing. The shaft 42 carries a pinion 57 in mesh with pinion 36 carried by the sleeve 25. Said shaft 42 also carries an eccentric or elliptical pinion 58 in mesh with a similar pinion 59 carried by shaft 43, which shaft also carries an escapement disk 60 adapted to cooperate with an escapement pinion 61 carried by the shaft 44, which latter shaft also carries an indicator dial 62. The shaft 45 carries a pinion 63 in mesh with the escapement pinion 61, said shaft also carrying an escapement disk 64 adapted to cooperate with an escapement pinion 65 carried by the shaft 46, said shaft also carrying an indicator dial 66.

Figure 12:
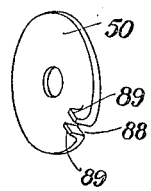
Fig. 12 is an enlarged perspective view of one of the escapement disks.

For producing cooperative engagement between the escapement pinions and escapement disks, each of said escapement pinions 51, 55, 61 and 65 is provided on one half of its axial thickness with twice as many teeth as on the other half. In other words, only every other tooth extends the full axial thickness of the pinion, the alternate teeth extending over only approximately half of said thickness, as clearly indicated on the pinions 55 and 65 at the lower portion of Fig. 1. Each of the escapement disks 50, 54, 60 and 64 is provided in its periphery with a radially extending recess or slot 88 (see Fig. 12), and on one side of the disk with a pair of projections or lugs 89, one at each side of said slot. From this construction it will be seen that on one half of the axial thickness of the escapement pinions the space between teeth is wider, by the thickness of a tooth plus one space than the space between teeth on the other half of said thickness. In practice, the escapement wheels are provided with twenty teeth, each alternate tooth extending the whole thickness of the wheel, while the remaining teeth extend for only one-half of such thickness. The escapement disks are so located that the normal circumference of each rests against the points of two of the longer teeth of its respective escapement wheel, so that at the moment one of the longer teeth on the wheel comes opposite the recess or gap 88 in the disk the leading projection 89 engages with the shorter tooth immediately following said longer tooth. Continued rotation of the disk thus moves the escapement wheel 36 degrees, or one-tenth of a revolution, the trailing projection 89 ensuring the correct amount of rotation.

Figure 11:
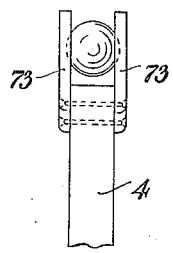
Fig. 11 is an end view of the anvil shown in Fig. 4.

The shoe 4 of the micrometer shown in Fig. 1 is provided with a fixed anvil 68 threaded at 69, and a detachable anvil 70 shown by the dotted lines is adapted to be screwed on to the thread 69 and firmly up against a shoulder to enable the micrometer to be used for smaller sizes. In the form shown in Figs. 4 and 11 the anvil 71 is formed on a sphere 72 and held between two cheek pieces 73, secured to the shoe 4, the shank of the anvil adjacent to the sphere 72 being of considerably smaller diameter than said sphere, as shown in dotted lines in Fig. 4, whereby the anvil is universally movable.

The extension 7 is slotted at 74 (see Fig. 4) graduated at one or both edges and receives a sliding member 75 marked with an index line. The sliding member has a pin or key 76 which engages with the internal groove 20 of the head or thimble 19.

In the form shown in Fig. 5 the extension 6 is threaded at 77, split in one or more places as at 78 and tapered at 79. A nut 80 with a corresponding thread and taper is provided which when tightened up locks the sleeve 12 to the body 2 and allows the micrometer to be used for repetition work.

A glass cover 81 held in a suitable frame 82 is secured to the body 2 by screws 83 countersunk into the frame and protected by seals 84. The glass cover 81 is opaque or blackened except for small apertures 86, through which the indicator dials can be read.

In the form of ratchet head shown in Fig. 9 an additional ratchet collar 87 free to rotate on the spindle 9 is interposed between the ratchet collar 15 and fixed ratchet 21 and the intermeshing teeth on the ratchet collar 87 and fixed ratchet 21 are in the reverse direction and deeper than on the other ratchet so that a greater effort is required to make them slip. The object of this is to prevent any undue force being applied to withdraw the spindle against any resistance such as a stop or shoulder. The ratchet head devices are applicable to any form of micrometer gauge.

In use assuming that the micrometer has been correctly adjusted the instrument is used in the ordinary manner. If any attempt is made to close the micrometer too hard on to the work the ratchet collar 15 is forced back against the spring 14 and only a predetermined force is transmitted to the spindle 9.

The elliptical gears take up any back lash and insure a rapid change of the indicator dials from one reading to another. This is important inasmuch as it will increase the life of the gearing, because the escapement disc can then be reduced in diameter in relation to the escapement wheel, ensuring greater locking power and immensely reducing wear. The escapement disc is rotated 10 times to one complete revolution of the escapement pinion. The dials 33, 52 and 56 are graduated in inches and the dials 34, 62 and 66 in millimeters. The small or minute difference between 50 threads per inch and 2 threads per millimeter is compensated for by the helical keyway 28 in the sleeve 25.

From the foregoing it will be obvious that the index disk or dial 52 will be angularly moved one step for each complete revolution of the index disk or dial 33, while the index disk or dial 56 in turn is moved one step for each complete rotation of the disk 52, so that the numerals appearing on the disks 52 and 56 through the openings in the cover will be multiples of that appearing on the dial 33. In like manner, the numerals appearing on the dials 62 and 66 will be multiples of that appearing on the dial 34.

A gauge made in accordance with this invention may be adapted for use as a depth or inside calipers.

What I claim and desire to secure by Letters Patent is:—

1. In a micrometer gauge, the combination of a rotatable head, and a plurality of means operated by the rotation of said head for indicating units of different character, said means having an angular movement relative to each other about an axis passing through all said means.

2. In a micrometer gauge, the combination of a rotatable head, a plurality of means operated by the rotation of said head for indicating units of different character, said means having an angular movement relative to each other about an axis passing through all said means, and means for rotating said head without operating any of said indicating means.

3. In a micrometer gauge, the combination of a rotatable head, a plurality of means operated by the rotation of said head for indicating units of different character, and means operated during the operation of the respective unit indicating means for indicating multiples of each of said units.

4. In a micrometer gauge, the combination of a rotatable head, and a plurality of dials operated by the rotation of said head and having an angular motion relatively to each other about an axis passing through all of said dials for indicating units of different character.

5. In a micrometer gauge, the combination of a rotatable head, a shaft adapted to be rotated by said head, indicator dials carried by said shaft for rotation therewith and graduated to units of different character, and means for causing relative angular movement between said dials about an axis passing through all of said dials.

6. In a micrometer gauge, the combination of a rotatable head, a shaft adapted to be rotated by said head, indicator dials carried by said shaft for rotation therewith and graduated to units of different character, means for causing relative angular movement between said dials about an axis passing through all of said dials, and cooperating means carried by the shaft and head for permitting rotation of said head without effecting rotation of the shaft.

7. In a micrometer gauge, the combination of a rotatable head, a plurality of dials operated by the rotation of said head and having an angular motion relatively to each other about an axis passing through all of said dials for indicating units of different character, dials for indicating multiples of said units, and motion transmitting means between said unit dials and multiple dials for rotating the latter one step for each revolution of the unit dials.

8. In a micrometer gauge, the combination of a rotatable head, a plurality of dials operated by the rotation of said head and having an angular motion relatively to each other about an axis passing through all of said dials for indicating units of different character, dials for indicating multiples of said units, gearing between said unit dials and multiple dials for rotating the latter one step for each revolution of the unit dials, and means for effecting a periodic accelerated movement of the gears during rotation of the dials.

9. In a micrometer gauge, the combination of a rotatable head, a shaft adapted to be rotated by said head and axially movable during its rotation, a plurality of indicator dials carried by said shaft and rotatable therewith, and cooperating means between the shaft and dials for causing angular movement of said dials relatively to each other about an axis passing through all of said dials for indicating units of different character.

10. In a micrometer gauge, the combination of a rotatable head, a shaft adapted to be rotated by said head and axially movable during its rotation, a sleeve mounted on said shaft for movement therewith, a plurality of sleeves mounted on said first sleeve for rotation therewith and each carrying an indicator disk, and cooperating means carried by said sleeves for causing angular movement of the dials relatively to each other about an axis passing through all of said dials for indicating units of different character.

11. In a micrometer gauge, the combination of a rotatable head, a shaft adapted to be rotated by said head and axially movable during its rotation, a sleeve mounted on said shaft for movement therewith, a pair of sleeves mounted on said first sleeve for rotation therewith and each carrying an indicator disk, and a pin and slot connection between said first sleeve and one of said dial sleeves for causing angular movement of the dials relatively to each other about an axis passing through all of said dials for indicating units of different character.

12. In a micrometer gauge, the combination of a rotatable head, a shaft adapted to be rotated by said head and axially movable during its rotation, a sleeve mounted on said shaft for movement therewith, a pair of sleeves mounted on said first sleeve for rotation therewith and each carrying an indicator dial, a pin carried by said first sleeve, one of said dial sleeves being provided with a helical slot cooperating with said pin for causing angular movement of the dials relatively to each other about an axis passing through all of said dials for indicating units of different character.

13. In a micrometer gauge, the combination of a rotatable head carrying a ratchet member, a shaft having a ratchet member adapted to engage said first ratchet member thereby to rotate the shaft with said head, one of said ratchet members being movable out of engagement with the other thereby to permit rotation of the head without effecting rotation of the shaft.

14. In a micrometer gauge, the combination of a rotatable head having a ratchet member, a shaft having a cooperating ratchet member, one of said ratchet members being axially movable, tension means for normally retaining the ratchet members in engagement thereby to rotate the shaft with said head, and means for adjusting said tension thereby to permit rotation of the head without effecting rotation of the shaft against a predetermined resistance.

15. In a micrometer gauge, a rotatable head, a ratchet member carried by said head, a ratchet member carried by the shaft and slidable into and out of engagement with said first ratchet member, tension means for normally retaining said ratchet members in engagement thereby to rotate the shaft with said head, and means for adjusting the tension thereby to permit rotation of the head without effecting rotation of the shaft against a predetermined resistance.

16. A micrometer gauge provided with an anvil having a universal movement.

In testimony whereof I have signed my name to this specification.

JOHN CICERI SMITH.